(12) United States Patent
Kaneko et al.

(10) Patent No.: US 7,301,348 B2
(45) Date of Patent: Nov. 27, 2007

(54) ELECTROSTATIC ENCODER

(75) Inventors: Shinji Kaneko, Kokubunji (JP); Jun Hane, Tokyo (JP)

(73) Assignee: Olympus Corporation, Tokyo (JP)

( * ) Notice: Subject to any disclaimer, the term of this patent is extended or adjusted under 35 U.S.C. 154(b) by 309 days.

(21) Appl. No.: 11/195,319

(22) Filed: Aug. 2, 2005

(65) Prior Publication Data

US 2006/0028214 A1 Feb. 9, 2006

(30) Foreign Application Priority Data

Aug. 5, 2004 (JP) .............................. 2004-229471

(51) Int. Cl.
*G01R 27/26* (2006.01)
*G00B 7/14* (2006.01)

(52) U.S. Cl. ............... 324/660; 324/662; 324/207.17; 324/207.24; 341/15; 340/870.01

(58) Field of Classification Search ............................... 324/207.15–207.17, 207.24–207.25, 658, 324/660, 662, 683, 686; 340/562, 870.01, 340/870.32; 341/15

See application file for complete search history.

(56) References Cited

U.S. PATENT DOCUMENTS 3,961,318 A 6/1976 Farrand et al.
4,743,902 A * 5/1988 Andermo ..................... 324/660
5,394,096 A * 2/1995 Meyer ......................... 324/686
5,889,280 A * 3/1999 Matsuura ................ 250/237 G
6,335,618 B1 * 1/2002 Nahum .................. 324/207.17

* cited by examiner

*Primary Examiner*—Jay M Patidar
(74) *Attorney, Agent, or Firm*—Scully, Scott, Murphy & Presser, P.C.

(57) ABSTRACT

An electrostatic encoder comprising receiving coupling electrodes formed on a scale, and extending in a predetermined direction, transmitting coupling electrodes provided on a sensor head, and located to face the receiving coupling electrodes, digital electrodes provided on the scale to extend from the receiving coupling electrodes in a direction perpendicular to the predetermined direction, and arranged at a predetermined pitch, two pairs of interdigital electrodes provided on the sensor head, and located to face the digital electrodes, a voltage applying portion configured to apply an alternating voltage to the transmitting coupling electrodes, and a potential difference detecting portion configured to detect a potential difference between the interdigital electrodes of each of the two pairs of interdigital electrodes. The two pairs of interdigital electrodes are arranged at the same pitch, and the each pair of interdigital electrodes are spaced apart from each other by a predetermined distance in the predetermined direction.

12 Claims, 3 Drawing Sheets

ELECTROSTATIC ENCODER

CROSS-REFERENCE TO RELATED APPLICATIONS

This application is based upon and claims the benefit of priority from prior Japanese Patent Application No. 2004-229471, filed Aug. 5, 2004, the entire contents of which are incorporated herein by reference.

BACKGROUND OF THE INVENTION

1. Field of the Invention

The present invention relates to an electrostatic encoder.

2. Description of the Related Art

Various kinds of encoders for use in controlling an actuator have been proposed. Of those encoders, an electrostatic encoder is superior in that: it can be made thinner, and the sensor itself is relatively cheap. As a method of manufacturing such an electro-static encoder, for example, the method disclosed in U.S. Pat. No. 3,961,318 is known. According to this method, a sensor head and a scale can be each formed by using a simple wiring board, as a result of which a very thin encoder can be manufactured at a relatively low cost.

BRIEF SUMMARY OF THE INVENTION

According to an aspect of the present invention, there is provided an electrostatic encoder comprising:

a scale;

a sensor head provided to face the scale, and movable relative to the scale in a predetermined direction;

a pair of receiving coupling electrodes formed on the scale, and extending in the predetermined direction;

transmitting coupling electrodes provided on the sensor head, and located to face the pair of receiving coupling electrodes;

digital electrodes provided on the scale to extend from the receiving coupling electrodes in a direction perpendicular to the predetermined direction, and arranged at a predetermined pitch;

two pairs of interdigital electrodes provided on the sensor head, and located to face the digital electrodes of the scale;

a voltage applying portion configured to apply an alternating voltage to the transmitting coupling electrodes; and a potential difference detecting portion configured to detect a potential difference between the interdigital electrodes of each of the two pairs of interdigital electrodes of the sensor head, wherein the two pairs of interdigital electrodes of the sensor head are arranged at the same pitch, and the each pair of interdigital electrodes are spaced apart from each other by a predetermined distance in the predetermined direction.

According to another aspect of the present invention, there is provided an electrostatic encoder comprising:

a scale;

a sensor head provided to face the scale, and movable relative to the scale in a predetermined direction;

a pair of receiving coupling electrodes formed on the scale, and extending in the predetermined direction;

a pair of transmitting coupling electrodes provided on the sensor head, and located to face the pair of receiving coupling electrodes;

digital electrodes provided on the scale to extend from the receiving coupling electrodes in a direction perpendicular to the predetermined direction, and arranged at a predetermined pitch;

two pairs of interdigital electrodes provided on the sensor head, and located to face the digital electrodes of the scale;

a voltage applying portion configured to apply an alternating voltage to the transmitting coupling electrodes; and a potential difference detecting portion configured to detect a potential difference between the interdigital electrodes of each of the two pairs of interdigital electrodes of the sensor head, wherein the two pairs of interdigital electrodes of the sensor head are arranged at the same pitch, and the each pair of interdigital electrodes are spaced apart from each other by a predetermined distance in the predetermined direction.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The best mode for carrying out the present invention will be explained with reference to the accompanying drawings.

Figure 1:
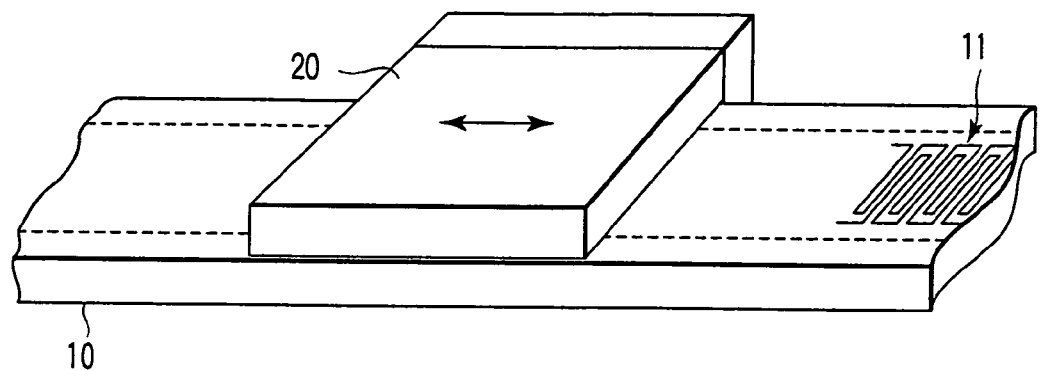
FIG. 1 is a view showing the entire structure of an electrostatic encoder according to a first embodiment of the present invention.

First, an electrostatic encoder according to a first embodiment of the present invention will be explained. As shown in FIG. 1, the electrostatic encoder according to the first embodiment comprises a scale 10 and a sensor head 20. The sensor head 20 is located to face the scale 10. The sensor head 20 can be displaced relative to the scale 10 in either of the directions indicated by the double-headed arrow in FIG. 1.

Figures 2, 3:
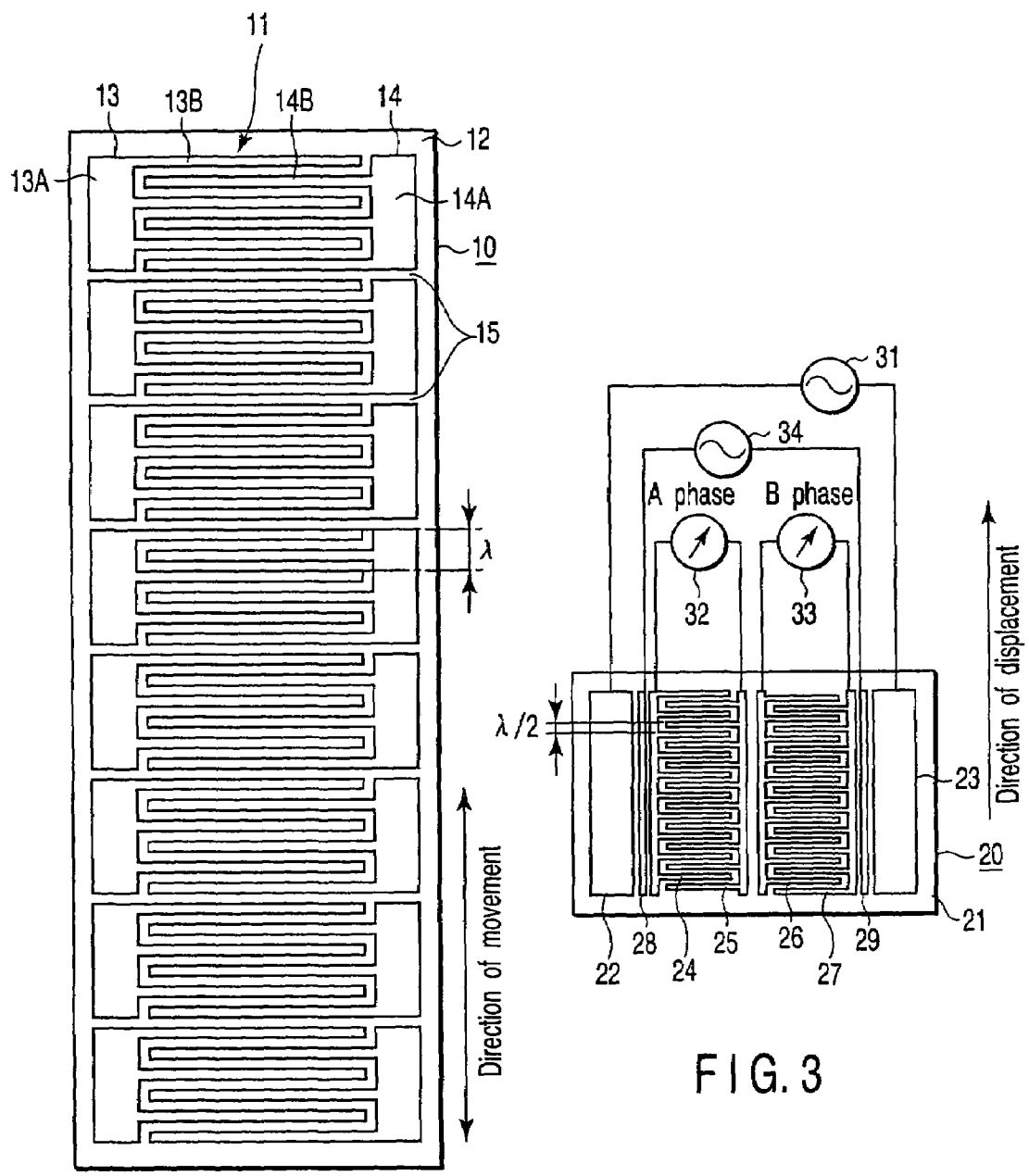
FIG. 2 is a view showing the structure of a scale in the electrostatic encoder according to the first embodiment of the present invention.
FIG. 3 is a view showing the structure of a sensor head in the electrostatic encoder according to the first embodiment of the present invention.

In the scale 10, as shown in FIG. 2, an interdigital electrode 11 is formed on a glass board 12. The interdigital electrode 11 comprises a first electrode 13 and a second electrode 14. The first electrode 13 comprises a basal portion 13A and digital portions 13B, and the second electrode 14 comprises a basal portion 14A and digital portions 14B. The digital portions 13B are arranged at a constant pitch λ, and the digital portions 14B are also arranged at the constant pitch λ. It should be noted that in the entire region of the scale 10, each of the basal portions 13A and 14B of the interdigital electrode 11 is divided into a plurality of regions by slits 15 located at appropriate regular intervals in the direction of relative displacement of the sensor head 20 against the scale 10, that is, the interdigital electrode 11 is divided into a plurality of regions by the slits 15. Also, a thin insulating layer not shown is formed on the surface of the interdigital electrode 11.

In the sensor head 20, as shown in FIG. 3, a number of electrodes are formed on a resin board 21. As those electrodes, a pair of feed electrodes 22 and 23, A-phase interdigital electrodes 24 and 25, B-phase interdigital electrodes 26 and 27 and sub-electrodes 28 and 29.

To be more specific, the A-phase digital electrodes 24 and 25 are located in parallel with the B-phase digital electrodes 26 and 27, and digital portions of the A-phase digital electrodes 24 and 25 and digital portions of the B-phase digital electrodes 26 and 27 are arranged in the same pitch. In this case, the digital electrodes 24 and 25 the digital electrodes 26 and 27 are located with a phase difference of fourth the pitch λ in the direction of the relative displacement of the sensor head 20 against the scale 10, the direction indicated by an arrow in FIG. 3. The pitch of the digital portions of the digital electrodes 24, 25, 26 and 27 is half the pitch λ of the digital portions 13B and 14B of the interdigital electrode 11 of the scale 10.

It should be noted that when the electrostatic encoder is actually used, the above electrodes on the sensor head 20 face the interdigital electrode 11 of the scale 10, and the feed electrodes 22 and 23 of the sensor head 20 faces the basal portions 13A and 14B of the interdigital electrode 11, respectively.

Furthermore, as shown in FIG. 3, which contains a connection diagram, the feed electrodes 22 and 23 are connected to an alternating voltage source 31; the A-phase interdigital electrodes 24 and 25 are connected to an A-phase voltmeter 32; the B-phase interdigital electrodes 26 and 27 are connected to a B-phase voltmeter 33; and sub-electrodes 28 and 29 are connected to a compensation signal source 34.

Then, the operation of the encoder according to the first embodiment will be explained.

From the alternating voltage source 31, an alternating voltage is applied to the feed electrodes 22 and 23 of the sensor head 20. As a result, due to electrostatic induction of the basal portions 13A and 14A of the interdigital electrode 11 of the scale 10, which face the feed electrodes 22 and 23, an alternating electric field generates at the digital portions 13B and 14B of the interdigital electrode 11, which are electrically connected to the basal portions 13A and 14A of the interdigital electrode 11. In regions which the digital portions 13A and 14B of the interdigital electrode 11 face, the A-phase interdigital electrodes 24 and 25 and the B-phase interdigital electrodes 26 and 27 are present. Therefore, the voltmeters 32 and 33 connected to the interdigital electrodes 24, 25, 26 and 27 detect a periodic potential change which depends on a relative displacement amount of the sensor head 20 against the scale 10. Needless to say, the potential change includes the change of a potential component which varies in accordance with the frequency of the alternating voltage source 31. However, the potential change caused only by the relative displacement of the sensor head 20 against the scale 10 can be measured by performing detection, and eliminating the above component.

Figure 4:
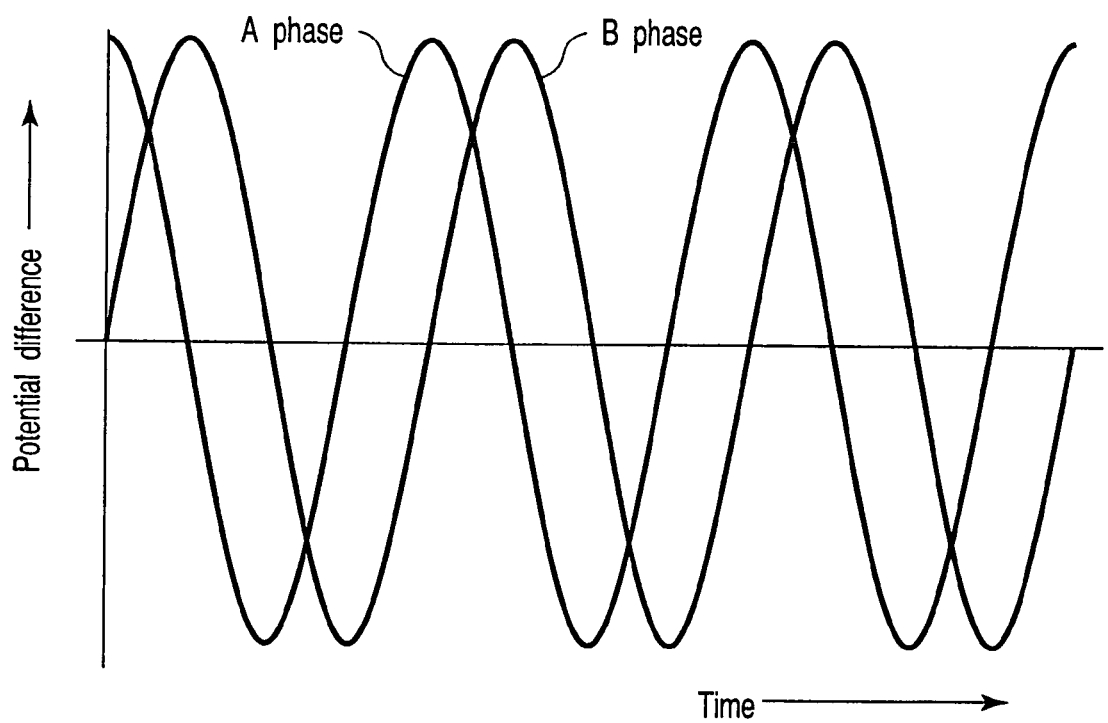
FIG. 4 is a schematic view which schematically shows outputs of an A-phase voltmeter and a B-phase voltmeter, which are obtained after phase detection.

FIG. 4 schematically shows the outputs of the A-phase voltmeter 32 and B-phase voltmeter 33, which are obtained after the phase detection, in the case where the sensor head 20 is displaced relative to the scale 10 in the direction indicated by the arrow in FIG. 3.

The A-phase interdigital electrodes 24 and 25, and the B-phase interdigital electrodes 26 and 27 are located at a phase difference of fourth the pitch λ, corresponding to 90° in phase. Therefore, the output phase of the B-phase voltmeter 33 lags that of the A-phase voltmeter 32 by 90°. On the other hand, in the case where the sensor head 20 is displaced in the direction opposite to that indicated by the arrow in FIG. 3, the output phase of the B-phase voltmeter 33 leads that of the A-phase voltmeter 32 by 90°. In such a manner, when the outputs of the A-phase voltmeter 32 and B-phase voltmeter 33 are both measured, the direction of the above displacement can be detected. Also, when a phase interpolation circuit is provided to obtain the phase angle of a Lissajous waveform of the outputs of the A-phase voltmeter 32 and B-phase voltmeter 33, the displacement amount of the sensor head 20 against the scale 10 can be determined with a higher resolution compared with the pitch of the interdigital electrode 11 of the scale 10.

In such a manner, the electrostatic encoder according to the first embodiment can detect the above displacement direction, and has a high resolution.

In the first embodiment, an alternating voltage is applied such that the phase of the alternating voltage at the feed electrode 22 is opposite to that at the feed electrode 23. However, even if one of the feed electrodes 22 and 23 is grounded, the function of the electrostatic encoder is still ensured.

However, in the electrostatic encoder having the above structure, the alternating voltage applied to the feed electrodes 22 and 23 may induce an alternating voltage to the interdigital electrode 11 of the scale 10 which may generate a noise, and has an adverse effect on electronic equipment provided in the vicinity of the electrostatic encoder. The greater the total area of the interdigital electrode 11, where the alternating voltage is induced, the more clearly the above phenomenon occurs. Furthermore, when the area of the interdigital electrode 11 of the scale 10 is great, the electrostatic encoder is easily influenced by noise generated by the electronic equipment in the vicinity of the electrostatic encoder. This is a problem, especially in the case where the scale 10 is greatly long with respect to the sensor head 20 in the displacement direction.

In the scale 10 in the first embodiment, as described above, each of the basal portions 13A and 14A of the interdigital electrode 11 is divided into a plurality of regions by the slits 15 at the appropriate regular intervals. Thus, an alternating electric field generates only at those parts of the digital portions 13B and 14B of the interdigital electrode 11 of the scale 10, which face the feed electrodes 22 and 23 of the sensor head 20. That is, application of a voltage through the feed electrodes 22 and 23 does not occur at part of the scale 10 which does not overlap the sensor head 20. This structural feature can therefore reduce the adverse effect of the electrostatic encoder on the electronic equipment provided in the vicinity of the electrostatic encoder. Furthermore, since the part of the interdigital electrode 11 which does not overlap the sensor head 20 is electrically disconnected by the slits 15, the influence of the noise generated from the electronic equipment provided in the vicinity of the electrostatic encoder can be reduced. Accordingly, the above displacement can be measured with a higher accuracy.

Moreover, in the case where the feed electrodes 22 and 23 of the sensor head 20 are located close to the A-phase interdigital electrodes 24 and 25 and the B-phase interdigital electrodes 26 and 27, the alternating voltage applied to the feed electrodes 22 and 23 directly influences the A-phase interdigital electrodes 24 and 25 and the B-phase interdigital electrodes 26 and 27. That is, the alternating voltage gives offsets to the outputs of the A-phase voltmeter 32 and B-phase voltmeter 33, which are obtained as schematically shown in FIG. 4 after the phase detection, thus reducing the accuracy of measuring the displacement. To restrict this reduction of the measurement accuracy, in the sensor head 20, the sub-electrodes 28 and 29 are respectively provided between the feed electrode 22 and the A-phase interdigital electrodes 24 and 25, and between the feed electrode 23 and the B-phase interdigital electrodes 26 and 27. For example, when the sub-electrodes 28 and 29 are grounded, the influence of the voltages of the -feed electrodes 22 and 23 upon the A-phase interdigital electrodes 24 and 25 and the B-phase interdigital electrodes 26 and 27 can be restricted. Furthermore, a certain voltage opposite in phase to that of the feed electrode 22 is applied to the sub-electrode 28, and a certain voltage opposite in phase to that of the feed electrode 23 can be applied to the sub-electrode 29 so as to cancel the influence of the voltages of the feed electrodes 22 and 23 upon the A-phase interdigital electrodes 24 and 25 and B-phase interdigital electrodes 26 and 27. In this case, preferably, the voltages to be applied should be adjusted such that after the phase detection, the outputs of the A-phase voltmeter 32 and B-phase voltmeter 33 are set at 0, with the scale 10 removed from the sensor head 20. In such a manner, when the sub-electrodes 28 and 29 are provided, and a potential control is properly carried out, offsets of the outputs of the A-phase voltmeter 32 and B-phase voltmeter 33, which are obtained as schematically shown in FIG. 4 after the phase detection, are restricted, and lowering of the measurement accuracy is also restricted.

Next, an electrostatic encoder according to a second embodiment of the present invention will be explained. In the electrostatic encoder according to the second embodiment, the scale 10 is identical to that shown in FIG. 2, but the sensor head 20 is different from that in FIG. 3.

Figure 5A:
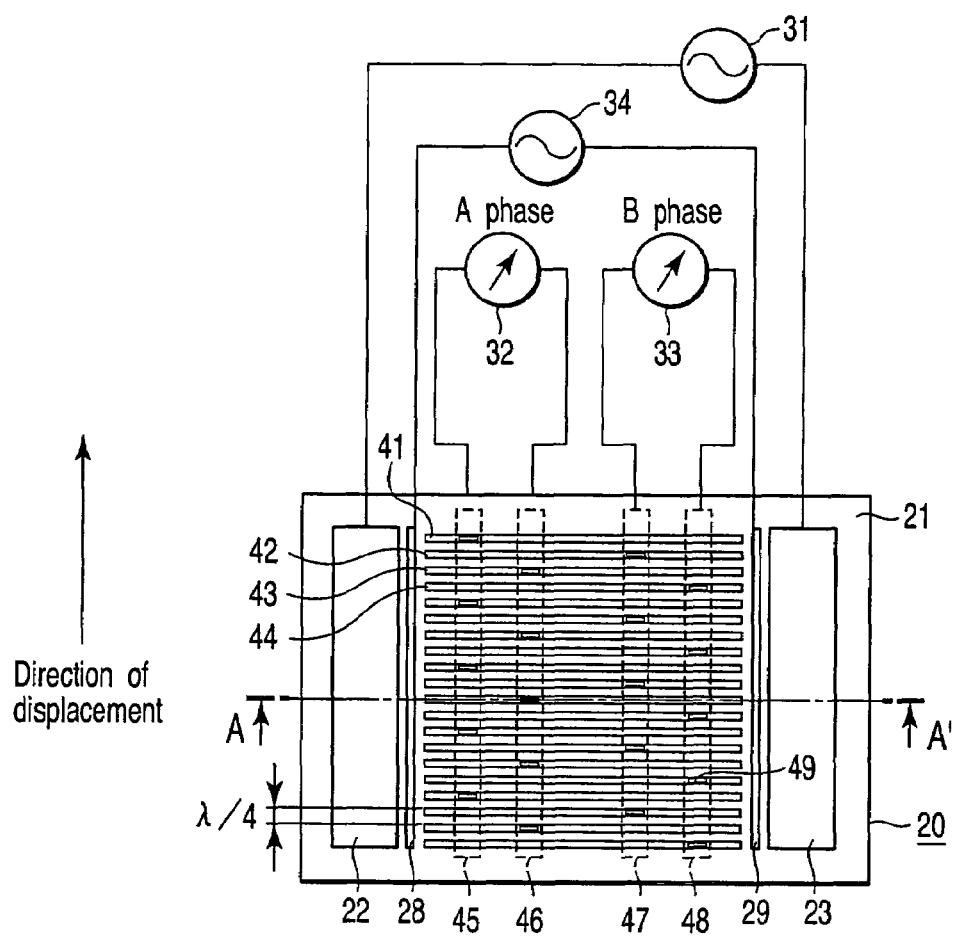
FIG. 5A is a view showing the structure of a sensor head in an electrostatic encoder according to a second embodiment of the present invention.
Figure 5B:
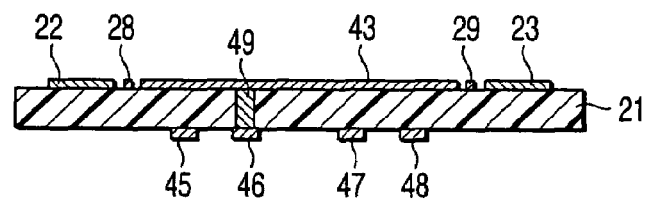
FIG. 5B is a vertical sectional view taken along line A-A' in FIG. 5A.

In the sensor head 20 used in the second embodiment, as shown in FIGS. 5A and 5B, the structures of the feed electrodes 22 and 23 and the sub-electrodes 28 and 29 are the same as those in FIG. 3, but the structures of the A-phase interdigital electrodes and B-phase interdigital electrodes are different from those in FIG. 3. To be more specific, the A-phase interdigital electrodes are separately arranged from the B-phase interdigital electrodes in FIG. 3, whereas in the second embodiment, A-phase interdigital electrodes and B-phase interdigital electrodes consist of four phase strip-shaped electrodes 41, 42, 43 and 44, interdigitatingly arranged at a pitch of λ/4 as shown in FIG. 5A. The output of each of the strip-shaped electrodes 41, 42, 43 and 44 of each group has one of four phases, respectively. Furthermore, wiring electrodes 45, 46, 47 and 48 having different phases in output are formed on a reverse surface of the board 21. The strip-shaped electrodes 41, 42, 43 and 44 are connected to the wiring electrodes 45, 46, 47 and 48 at their appropriate portions through contact holes 49. To be more specific, the strip-shaped electrodes 41, 42, 43 and 44 arranged at a constant pitch are successively connected to the wiring electrodes 45, 46, 47 and 48 through the contact holes 49, in units of one group, i.e., four strip-shaped electrodes, from the first four of the strip-shaped electrodes 41, 42, 43 and 44 from an upper side in FIG. 5A. However, to keep the figure simple, only the first four of all the strip-shaped electrodes are denoted by reference numerals 41, 42, 43 and 44. To be more specific, the wiring electrodes 45, 47, 46 and 48 correspond to phases of 0°, 90°, 180° and 270°, respectively. The wiring electrodes 45 and 46, corresponding to the phases of 0° and 180°, are connected to the A-phase voltmeter 32, and the wiring electrodes 47 and 48, corresponding to the phases of 90° and 270°, are connected to the B-phase voltmeter 33.

Due to the above connection, the A-phase voltmeter 32 and the B-phase voltmeter 33 output two signals whose phase difference is 90°. By virtue of this structural feature, the displacement of the sensor head 20 against the scale 10 can be measured as in the first embodiment. In the second embodiment, it is indispensable that wiring of the sensor head 20 is provided to have a two-layer structure, unlike the first embodiment. In this regard, the first embodiment is slightly more advantageous than the second embodiment in terms of manufacturing cost. However, in the second embodiment, since the A-phase and B-phase interdigital electrodes are arranged alternately, even if the sensor head 20 or the scale 10 is slightly inclined, thereby losing parallelism, the displacement of the sensor head 20 against the scale 10 can be stably measured.

The present invention will be explained by referring to the above embodiments; however, it is not limited to the embodiments. Needless to say, various modifications and applications can be made without departing from the subject matter of the present invention. For example, it should be noted that in the above embodiments, by virtue of the interdigital electrodes of the scale 10, the output signal is large, and the S/N ratio of the signal is improved. However, even if one of the set of the basal portions 13A and the digital portions 13B and the set of the basal portions 14A and the digital portions 14B, which are formed as shown in FIG. 2, e.g., the set of the basal portions 14A and the digital portions 14B, is omitted, the resulting structure can still function as an electrostatic encoder. In this case, since the feed electrode 23 of the sensor head 20 can also be omitted, the width of the sensor 20 can be shortened. Therefore, although this electrostatic encoder is slightly inferior in function to those according to the above embodiments, it is advantageous where a smaller electrostatic encoder is required.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electrostatic encoder comprising:
   a scale;
   a sensor head provided to face the scale, and movable relative to the scale in a predetermined direction;
   a pair of receiving coupling electrodes formed on the scale, and extending in the predetermined direction;
   transmitting coupling electrodes provided on the sensor head, and located to face the pair of receiving coupling electrodes;
   digital electrodes provided on the scale to extend from the receiving coupling electrodes in a direction perpendicular to the predetermined direction, and arranged at a predetermined pitch;

two pairs of interdigital electrodes provided on the sensor head, and located to face the digital electrodes of the scale;

a voltage applying portion configured to apply an alternating voltage to the transmitting coupling electrodes; and a potential difference detecting portion configured to detect a potential difference between the interdigital electrodes of each of the two pairs of interdigital electrodes of the sensor head, wherein the two pairs of interdigital electrodes of the sensor head are arranged at the same pitch, and said each pair of interdigital electrodes are spaced apart from each other by a predetermined distance in the predetermined direction.

2. The encoder according to claim 1, wherein each of the receiving coupling electrodes is divided into a plurality of regions in the predetermined direction.

3. The encoder according to claim 1, further comprising a pair of sub-electrodes provided on the sensor head to extend in the predetermined direction, and respectively located between the transmitting electrodes and the interdigital electrodes.

4. The encoder according to claim 3, wherein at least one of the sub-electrodes is grounded.

5. The encoder according to claim 3, wherein an alternating voltage is applied to at least one of the sub-electrodes, the alternating voltage canceling an influence of an alternating voltage applied to the transmitting coupling electrode upon a potential of the interdigital electrodes.

6. The encoder according to claim 1, wherein said each pair of interdigital electrodes are interdigitatingly arranged.

7. An electrostatic encoder comprising:

a scale;

a sensor head provided to face the scale, and movable relative to the scale in a predetermined direction;

a pair of receiving coupling electrodes formed on the scale, and extending in the predetermined direction;

a pair of transmitting coupling electrodes provided on the sensor head, and located to face the pair of receiving coupling electrodes;

digital electrodes provided on the scale to extend from the receiving coupling electrodes in a direction perpendicular to the predetermined direction, and arranged at a predetermined pitch to interdigitate;

two pairs of interdigital electrodes provided on the sensor head, and located to face the digital electrodes of the scale;

a voltage applying portion configured to apply an alternating voltage to the transmitting coupling electrodes; and a potential difference detecting portion configured to detect a potential difference between the interdigital electrodes of each of the two pairs of interdigital electrodes of the sensor head, wherein the two pairs of interdigital electrodes of the sensor head are arranged at the same pitch, and said each pair of interdigital electrodes are spaced apart from each other by a predetermined distance in the predetermined direction.

8. The encoder according to claim 7, wherein each of the receiving coupling electrodes is divided into a plurality of regions in the predetermined direction.

9. The encoder according to claim 7, further comprising a pair of sub-electrodes provided on the sensor head to extend in the predetermined direction, and respectively located between the transmitting electrodes and the interdigital electrodes.

10. The encoder according to claim 9, wherein at least one of the sub-electrodes is grounded.

11. The encoder according to claim 9, wherein an alternating voltage is applied to at least one of the sub-electrodes, the alternating voltage canceling an influence of an alternating voltage applied to the transmitting coupling electrode upon a potential of the interdigital electrodes.

12. The encoder according to claim 7, wherein said each pair of interdigital electrodes are interdigitatingly arranged.

* * * * *